United States Patent Office 3,631,071
Patented Dec. 28, 1971

3,631,071
S-AROYL-, S-THIOAROYL-, AND S-[(N-ARYL) HYDROCARBYLIMIDOYL]HYDROSULFAMINES
Maynard S. Raasch, Fairfax, Wilmington, Del., assignor to E. I. du Pont de Nemours and Company, Wilmington, Del.
No Drawing. Filed Sept. 15, 1969, Ser. No. 858,101
Int. Cl. C07c 153/01; C07d 5/14
U.S. Cl. 260—347.2
19 Claims

ABSTRACT OF THE DISCLOSURE

Novel substituted hydrosulfamines useful as rubber curing agents, of the formula:

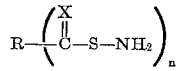

where $n$ is 1, 2, or 3; X is O, S, or NR'; when X is O or S, R is substituted or unsubstituted aryl; when X is NR', R is substituted or unsubstituted alkyl, aralkyl or aryl; and R' is substituted or unsubstituted aryl. The above compounds are prepared by the reaction of alkali metal or alkaline earth metal hydroxylamine-O-sulfonates with arenecarbothioate, arenecarbodithioate and (N-aryl)hydrocarbylcarboximidothioate alkali metal salts.

BACKGROUND OF THE INVENTION

Field of the invention

This invention is concerned with a new class of substituted hydrosulfamines which are useful as rubber curing agents and a process for their preparation.

Description of the prior art

The reaction of acetylsulfur chloride with diethylamine in ether giving S-acetyl-N,N-diethylhydrosulfamine has been reported [H. Böhme and M. Clement, Ann., 576, 61–69 (1952)]. However, on standing sulfur soon precipitated, and diethylacetamide was obtained by evaporating the ether. Piperidine gave analogous results. Aniline yielded S-acetyl-N-phenylhydrosulfamine as an oil. After standing for one day at 3°–5° C. it was 50% decomposed. Decomposition was complete after three days.

SUMMARY OF THE INVENTION

According to the present invention there are provided substituted hydrosulfamines of the formula:

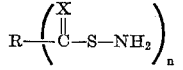

wherein $n$ is 1, 2, or 3; X is O, S, or NR'; when X is O or S, R is a substituted or unsubstituted aryl radical of up to 18 carbon atoms; when X is NR', R is a substituted or unsubstituted alkyl, aralkyl or aryl radical of up to 18 carbon atoms; R' is a substituted or unsubstituted aryl radical of up to 18 carbon atoms.

According to the present invention there is also provided a process for the preparation of the above substituted hydrosulfamines consisting essentially of contacting compounds of the formula:

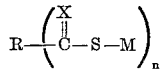

wherein $n$, R and X are defined as above and M is an alkali metal or alkaline earth metal hydroxylamine-O-sulfonates in the presence of water at about 0°–100° C.

The use of the phrase "consisting essentially of" in the above context does not exclude unspecified conditions or materials which do not prevent the advantages of the present invention from being realized.

DESCRIPTION OF THE PREFERRED EMBODIMENTS

The compounds of this invention are the S-aroyl-, S-thioaroyl-, and S-[(N-aryl)hydrocarbylimidoyl]hydrosulfamines. They may be represented by Formula I:

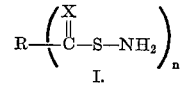

where $n$ is 1, 2, or 3; X is O, S, or NR'; when X is O or S, R is substituted or unsubstituted aryl; when X is NR', R is substituted or unsubstituted alkyl, aralkyl or aryl; and R' is substituted or unsubstituted aryl.

In the definitions of R and R', aryl includes aromatic hydrocarbon groups of 18 carbon atoms or less such as phenyl, naphthyl, biphenylyl, fluorenyl, anthryl, pyrenyl, and chrysenyl, as well as furyl and thienyl. Alkyl (including aralkyl) includes aliphatic and arylaliphatic hydrocarbon groups of 18 carbon atoms or less such as lower alkyl, octyl, decyl, dodecyl, heptadecyl, octadecyl, benzyl, phenethyl, and the like. Substituents on these aryl and alkyl (including aralkyl) groups include lower alkyl, lower alkoxy, aryloxy, halogen (F, Cl, Br, I), hydroxy, nitro, lower alkylthio, lower alkylsulfonyl, phenylsulfonyl, phenylazo, and trifluoromethyl. The number of substituents on any aryl, alkyl, or aralkyl group may be up to the number of positions available but not greater than 5.

In the context of "lower alkyl" and "lower alkoxy" the word "lower" refers to methyl, ethyl, propyl, butyl, etc., up to and including radicals containing six carbon atoms.

Compounds of Formula I are prepared by the reaction of an alkali metal or alkaline earth metal hydroxylamine-O-sulfonate with the corresponding arenecarbothioate, arenecarbodithioate, and (N-aryl)hydrocarbylcarboximidothioate metal salts to yield the respective S-aroylhydrosulfamines, S-thioaroylhydrosulfamines and S-[(N-aryl)hydrocarbylimidoyl]hydrosulfamines. This reaction may be represented as follows:

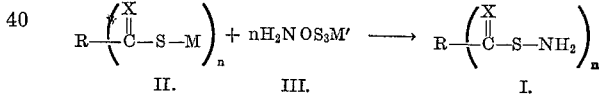

In this reaction, $n$, R and X are defined as above, M is an alkali metal, i.e., Li, Na, K, Rb, Cs, or Fr, and M' is preferably an alkali metal as M but may also be one equivalent of selected alkaline earth metals such as Mg, Ca, and Sr.

In carrying out the reaction shown above, compounds of Formula II and of Formula III may be brought together under a variety of equivalent molar proportions. For example, equivalent molar ratios of 10:1 to 1:10 are operable. It is preferred to use molar equivalent ratios more nearly equal and ratios of 1:1 to 1:2 are preferred.

The reaction may be carried out in water at temperatures in the range from 0–100° C. Because of the risk of decomposition of reactants and products, temperatures in the range of 0–50° C. are preferred and temperatures in the range of 10–25° C. are particularly convenient.

Reaction times vary widely, from a few minutes to a day or more, however, the reaction is usually complete within an hour or two.

Pressures above and below atmospheric are operable and atmospheric pressure is preferred for convenience.

The alkali metal arenecarbothioate and alkali metal arenecarbodithioate starting materials are prepared in solution by dissolving the corresponding thio- and dithioacids in aqueous solutions of alkali metal hydroxides. The alkali metal (N-aryl)hydrocarbylcarboximidothioate starting materials are prepared in solution by dissolving the corresponding thioamides in aqueous solutions of alkali metal hydroxides. For example, in addition to sodium hydroxide, other strong bases may be used, such as lithium hydroxide and potassium hydroxide.

The alkali metal or alkaline earth metal hydroxylamine-O-sulfonate starting material is prepared by neutralizing hydroxylamine-O-sulfonic acid with an aqueous solution of e.g. sodium hydroxide. Other bases may also be used, such as lithium hydroxide, potassium hydroxide, calcium hydroxide, and the like, as well as carbonates or bicarbonates of these metals.

The products are recovered by known means such as by filtering from the aqueous reaction mixture. They may be purified if desired by recrystallization from known organic solvents.

The products of this invention having the formula ArCOSNH$_2$ are stable to storage as crystalline solids at room temperature, and some seem to be stable at 100° C. even though melted.

Thioacids can be made by reaction of the corresponding acid chlorides with potassium hydrogen sulfide according to the procedure described for thiobenzoic acid by P. Noble, Jr. and D. S. Tarbell, "Organic Syntheses," Coll. vol. IV, p. 924. The aryl dithio acids are made by treating trichloromethyl derivatives of aromatic compounds with sodium sulfide or by reaction of aryl Grignard reagents with carbon disulfide. Thioamides are made by reaction of amides with phosphorus pentasulfide.

The present invention will be further described in terms of the following examples, wherein all parts and percentages are by weight unless otherwise indicated.

The nuclear magnetic resonance (NMR) spectra of the products of the examples were measured in CDCl$_3$ and agreed with the structures shown. The NH$_2$ band appears at 1.90 to 3.21 p.p.m.

EXAMPLE 1

S-benzoylhydrosulfamine (R=phenyl; X=O; n=1)

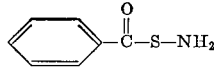

A solution of 37.4 g. (0.33 mole) of hydroxylamine-O-sulfonic acid in 75 ml. of water was neutralized below 20° C. with 13.2 g. (0.33 mole) of sodium hydroxide in 75 ml. of water. This solution was added slowly with stirring, with cooling in ice to keep the temperature below 25° C., to a solution of freshly distilled thiobenzoic acid (41.4 g., 0.3 mole, B.P. 56° C./0.3 mm.) dissolved in 12 g. (0.3 mole) of sodium hydroxide in 200 ml. of water. The S-benzoylhydrosulfamine soon precipitated and formed a thick slurry. After one hour it was filtered off, washed with water, and air-dried. The yield was 41 g. (90%). After recrystallization from dichloromethane, the compound melted at 89–90° C.

*Analysis.*—Calculated for C$_7$H$_7$NOS (percent): C, 54.76; H, 4.61; N, 9.14. Found (percent): C, 54.25; H, 4.68; N, 9.06.

EXAMPLE 2

S-anisoylhydrosulfamine (R=p-methoxyphenyl; X=O; n=1)

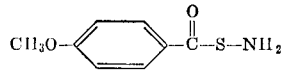

The reaction was carried out as in Example 1 using thioanisic acid. The yield was 94%. After recrystallization from ether, the compound melted at 99–100° C.

*Analysis.*—Calculated for C$_8$H$_9$NO$_2$S (percent): C, 52.44; H, 4.95; N, 7.64. Found (percent): C, 52.10; H, 4.91; N, 7.63.

EXAMPLE 3

S-(p-nitrobenzoyl)hydrosulfamine (R=p-nitrophenyl; X=O; n=1)

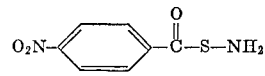

The reaction was carried out as in Example 1 with p-nitrothiobenzoic acid. The product contained about 37% of p-nitrobenzamide from decomposition of the hydrosulfamine. The product was taken up in chloroform, the p-nitrobenzamide was filtered off, and the S-(p-nitrobenzoyl)hydrosulfamine was crystallized from the filtrate in 41% yield. The M.P. was 113–114° C.

*Analysis.*—Calculated for C$_7$H$_6$N$_2$O$_3$S (percent): C, 42.41; H, 3.05; N, 14.14. Found (percent): C, 42.80; H, 3.03; N, 14.01.

EXAMPLE 4

S-(3,4-dichlorobenzoyl)hydrosulfamine

R=3,4-dichlorophenyl; X=O; n=1)

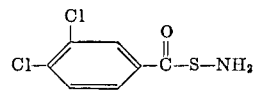

This compound was made from 3,4-dichlorothiobenzoic acid in 95% yield by the procedure of Example 1. The M.P. was 119–120° C. after recrystallization from dichloromethane.

*Analysis.*—Calculated for C$_7$H$_5$Cl$_2$NOS (percent): C, 37.84; H, 2.27; N, 6.31. Found (percent): C, 37.73; H, 2.05; N, 6.20.

EXAMPLE 5

S,S'-terephthaloylbis(hydrosulfamine)

(R=p-phenylene; X=O; n=2)

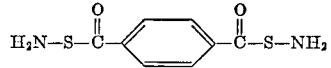

Dithiolterephthalic acid was converted to S,S'-terephthaloylbis(hydrosulfamine) in 81% yield by the procedure of Example 1. The compound was recrystalized from acetonitrile, but it is only slightly soluble. When placed on a melting point block at 185° C., it melted with decomposition and then became solid.

*Analysis.*—Calculated for C$_8$H$_8$N$_2$O$_2$S$_2$ (percent): C, 42.09; H, 3.53; N, 12.25. Found (percent): C, 42.17; H, 3.59; N, 12.18.

EXAMPLE 6

S-(1-naphthoyl)hydrosulfamine
(R=naphthyl; X=O; n=1)

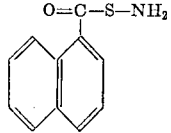

This compound, obtained in 93% yield from thio-1-naphthoic acid, by the procedure of Example 1, was recrystallized from carbon tetrachloride and melted at 76.5–77.5° C.

*Analysis.*—Calculated for C$_{11}$H$_9$NOS (percent): C, 64.99; H, 4.46; N, 6.87. Found (percent): C, 64.43; H, 4.18; N, 6.82.

EXAMPLE 7

S-(2-furoyl)hydrosulfamine
(R=furyl; X=O; n=1)

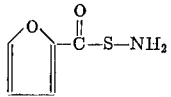

S(2-furoyl)hydrosulfamine was obtained in 70% yield by the procedure of Example 1 from thio-2-furoic acid.

It was recrystallized from carbon tetrachloride, at a concentration of 2 ml./g., by heating to 55° C. and cooling. The M.P. was 60–61° C.

*Analysis.*—Calculated for $C_5H_5NO_2S$ (percent): C, 41.94; H, 3.52; N, 9.78. Found (percent): C, 42.06; H, 3.37; N, 9.90.

EXAMPLE 8

S-thiobenzoylhydrosulfamine
(R=phenly; X=S; n=1)

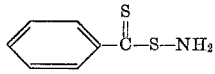

An alcoholic solution of potassium dithiobenozate was prepared from benzotrichloride and potassium sulfide following the directions of F. Kurzer and A. Lawson, "Organic Syntheses" 42, 100 (1962). The ethanol was removed under reduced pressure, and the residual salt was dissolved in 200 ml. of water and extracted with ether. The aqueous layer was separated and acidified with 25 ml. of hydrochloric acid. The dithiobenzoic acid was collected with two 150-ml. portions of ether, dried over sodium sulfate, and the ether was removed to leave 25 g. of a purple oil.

This 25 g. of crude dithiobenzoic acid was aminated according to the procedure used in Example 1. The orange, crystalline S-thiobenzoylhydrosulfamine was filtered off while the aqueous phase was at 15° C.; the yield was 23 g. (84%), and the M.P. was about 29° C. The compound is conveniently stored at 4° C.

EXAMPLE 9

S(p-chlorothiobenzoyl)hydrosulfamine
(R=p-chlorophenyl; X=S; n=1)

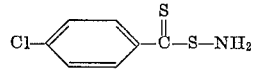

Crystalline p-chlorodithiobenzoic acid was prepared according to the procedure used for dithiobenzoic acid in Example 8 except that p-chlorobenzotrichloride was used. Amination by the procedure of Example 1 gave an 87% yield of orange S-(p-chlorothiobenzoyl)hydrosulfamine, having an M.P. of 60–61° C. after recrystallization from hexane. For prolonged storage, the compound should be kept at 4° C.

*Analysis.*—Calculated for $C_7H_6ClNS_2$ (percent): C, 41.27; H, 2.98; N, 6.88. Found (percent): C, 41.75; H, 2.80; N, 6.62.

EXAMPLE 10

S-(N-phenylacetimidoyl)hydrosulfamine
(R=methyl; X=N-phenyl; n=1)

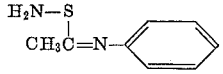

Thioacetanilide (25 g., 0.166 mole) was dissolved in 200 ml. of water containing 7 g. (0.175 mole) of sodium hydroxide. Addition below 20° C. of 22.6 g. (0.2 mole) of hydroxylamine-O-sulfonic acid in 45 ml. of water neutralized below 20° C. with 8 g. (0.2 mole) of sodium hydroxide in 45 ml. of water caused the precipitation of S - (N - phenylacetimidoyl)hydrosulfamine. The product was blotted on paper and the yield was 24 g. (88%). A sample recrystallized from methanol melted at 69.5–71° C. For prolonged storage, the compound is best kept at −80° C.

*Analysis.*—Calculated for $C_8H_{10}N_2S$ (percent): C, 57.76; H, 6.06; N, 16.85. Found (percent): 57.65; H, 5.99; N, 16.46.

EXAMPLE 11

S-(N-phenylbenzimidoyl)hydrosulfamine
(R=phenyl; X=N-phenyl; n=1)

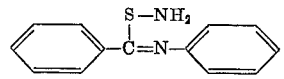

Thiobenzanilide (42.7 g., 0.2 mole) was dissolved in 400 ml. of water containing 16 g. (0.4 mole) of sodium hydroxide. Amination was accomplished by adding below 20° C. with stirring a solution of 27 g. (0.24 mole) of hydroxylamine-O-sulfonic acid in 60 ml. of water neutralized with 9.6 g. (0.24 mole) of sodium hydroxide in 60 ml. of water. The initial addition produced a sticky precipitate which was scratched to provide seed crystals. The product was filtered off and air-dried to give 43 g. (94% yield). Recrystallization twice from cyclohexane left 28 g. (61% yield) of S-(N-phenylbenzimidoyl)hydrosulfamine, having an M.P. of 68–69° C. An additional 5 g. (11%) of pure compound was isolated from the mother liquor. For prolonged storage the compound is kept at 4° C.

*Analysis.*—Calculated for $C_{13}H_{12}N_2S$ (percent): C, 68.39; H, 5.30; N, 12.27. Found (percent): C, 68.21; H, 5.29; N, 12.29.

When the thioacids and dithioacids shown in col. A of Table I are neutralized with sodium hydroxide and treated with sodium hydroxylamine-O-sulfonate by the procedure of Example 1, the hydrosulfamines shown in col. B of Table I are obtained.

TABLE I

| Item | A. Acid starting material | B. Hydrosulfamine product |
|---|---|---|
| 1 | o-Thiotoluic acid | S-(o-toluoyl)hydrosulfaminem. |
| 2 | p-Thiotoluic acid | S-(p-toluoyl)hydrosulfaine. |
| 3 | p-Fluorothiobenzoic acid | S-(p-fluorobenzyol)hydrosulfamine. |
| 4 | p-Bromothiobenzoic acid | S-(p-bromobenzoyl)hydrosulfamine. |
| 5 | 3,5-dinitrothiobenzoic acid | S-(3,5-dinitrobenzoyl)hydrosulfamine. |
| 6 | p-Phenylthiobenzoic acid | S-(p-phenylbenzoyl)hydromsulfamine. |
| 7 | Thio-β-naphthoic acid | S-(β-naphthoyl)hydrosulfamine. |
| 8 | Dithioisophthalic acid | S,S'-isophthaloylbis(hydrosulfamine). |
| 9 | 2,5-dimethoxydithiolterephthalic acid. | S,S'-(2,5-dimethoxy)terephthaloylbis(hydrosulfamine. |
| 10 | Dithio-p-toluic acid | S-thio-p-toluoylhydrosulfamine. |
| 11 | 1,3,5-Benzenetrithioltricarboxylic acid. | S,S',S''-trimesoyltris-(hydrosulfamine). |
| 12 | o-Chlorothiobenzoic acid | S-(o-chlorobenzoyl)hydrosulfamine. |
| 13 | m-Chlorothiobenzoic acid | S-(m-Chlorobenzoyl)hydrosulfamine. |
| 14 | p-Chlorothiobenzoic acid | S-(p-chlorobenzoyl)hydrosulfamine. |
| 15 | 2,4-Dichlorothiobenzoic acid | S-(2,4-Dichlorobenzoyl)-hydroxulfamine. |
| 16 | Pentafluorothiobenzoic acid | S-pentafluorobenzoylhydrosulfamine. |
| 17 | 2,3,5,6-Tetrachlorodithiolterephthalic acid. | S,S'-(2,3,5,6-tetrachloroterephthaloyl)bis(hydrosulfamine). |
| 18 | m-Trifluoromethylthiobenzoic acid. | S-(m-trifluoromethylbenzoyl)-hydrosulfamine. |
| 19 | Acetylthiosalicylic acid | S-acetylsalicyloylhydrosulfamine. |
| 20 | Anthracene-9-thiocarboxylic acid. | S-(9-anthroyl)hydroxulfamine. |
| 21 | 4-n-Butoxythiobenzoic acid | S-(4-n-butoxybenzoyl) hydrosulfamine. |
| 22 | 4-Chloro-3,5-dinitrothiobenzoic acid. | S-(4-chloro-3,5-dinitrobenzoyl)hydrosulfamine. |
| 23 | 4-(p-Chlorophenylsulfonyl)-thiobenzoic acid. | S-[4-(p-chlorophenylsulfonyl)-benzyol]hydrosulfamine. |
| 24 | 2,3-dimethoxythiobenzoic acid. | S-(2,3-dimethoxybenzoyl)-hydrosulfamine. |
| 25 | 2,4-dimethylthiobenzoic acid. | S-(2,4-dimethylbenzoyl)hydrosulfamine. |
| 26 | 3,5-dinitro-o-thiotoluic acid | S-(3,5-dinotro-o-toluoyl)-hydroxulfamine. |
| 27 | Dithioldiphenic acid | S,S'-diphenoylbis(hydrosulfamine). |
| 28 | p-Dodecyloxythiobenzoic acid | S-(p-docecyloxybenzoyl)-hydrosulfamine. |
| 29 | 1-fluorenethiocarboxylic acid | S-(1-fluorenecarbonyl)-hydrosulfamine. |
| 30 | o-(Hexadecylthio)thiobenzoic acid. | S-(o-Hexadecylthiobenzoyl)-hydrosulfamine. |

| Item | A. Acid starting material | B. Hydrosulfamine product |
|---|---|---|
| 31 | m-Iodothiobenzoic acid | S-(m-iodobenzoyl)hydrosulfamine. |
| 32 | 3-methoxy-2-nitrothiobenzoic acid. | S-(3-methoxy-2-nitrobenzoyl)-hydrosulfamine. |
| 33 | 2-methyl-3-nitrothiobenzoic acid. | S-(2-methyl-3-nitrobenzoyl)-hydrosulfamine. |
| 34 | p-Methylsulfonylthiobenzoic acid. | S-(p-methylsulfonylbenzoyl)-hydrosulfamine. |
| 35 | 4-methylsulfonyl-3-nitrothiobenzoic acid. | S-(4-methylsulfonyl-3-nitrobenzoyl)hydrosulfamine. |
| 36 | 4-methylthio-3-nitrothiobenzoic acid. | S-(4-methylthio-3-nitrobenzoyl)hydrosulfamine. |
| 37 | 3-nitro-1-thionaphthoic acid | S-(3-nitro-1-naphthoyl)hydrosulfamine. |
| 38 | 3,4,5-trimethoxythiobenzoic acid. | S-(3,4,5-trimethoxybenzoyl)-hydrosulfamine. |
| 39 | p-Phenylazothiobenzoic acid | S-(p-Phenylazobenzoyl)hydrosulfamine. |
| 40 | m-Trifluoromethyldithiobenzoic acid. | S-(m-trifluoromethylthiobenzoyl)hydrosulfamine. |
| 41 | p-Phenoxydithiobenzoic acid | S-(p-phenoxythiobenzoyl)-hydrosulfamine. |
| 42 | p-Fluorodithiobenzoic acid | S-(p-fluorobenzoyl)-hydrosulfamine. |
| 43 | 4-biphenyldithiocarboxylic acid. | S-(4-biphenylthiocarbonyl)-hydrosulfamine. |
| 44 | 4-methyldithio-1-naphthoic acid. | S-(4-methyl-1-thionaphthoyl)-hydrosulfamine. |
| 45 | Dithio-p-toluic acid | S-(thio-p-toluoyl(hydrosulfamine. |
| 46 | Dithioanisic acid | S-thioanisoylhydrosulfamine. |
| 47 | Thio-2-thiophenecarboxylic acid. | S-(2-thiophenecarbonyl)-hydrosulfamine. |

When the thioamides shown in col. A of Table II are dissolved in aqueous sodium hydroxide and treated with sodium hydroxylamine-O-sulfonate by the procedure of Example 10 or Example 11, the hydrosulfamines shown in col. B of Table II are obtained.

TABLE II

| Item | A. Thioamide starting Material | B. Hydrosulfamine product |
|---|---|---|
| 1 | N-m-tolylthioacetamide | S-(N-m-tolylacetimidoyl)-hydrosulfamine. |
| 2 | N-(o-ethylphenyl)thioacetamide. | S-(N-o-ethylphenylacetimidoyl)-hydrosulfamine. |
| 3 | N-α-naphthylthioacetamide | S-(N-α-naphthylacetimidoyl)-hydrosulfamine. |
| 4 | N-p-chlorophenylthioacetamide. | S-(N-p-chlorophenylacetimidoyl)hydrosulfamine. |
| 5 | N-m-anisylthioacetamide | S-(N-m-anisylacetimidoyl)-hydrosulfamine. |
| 6 | N-(p-Phenylazophenyl)-thioacetamide. | S-(N-p-phenylazophenylacetimidoyl)hydrosulfamine. |
| 7 | Thiopropionanilide | S-(N-phenylpropionimidoyl)-hydrosulfamine. |
| 8 | Thio-p-propionotoluidide | S-(N-p-tolylpropionimidoyl)-hydrosulfamine. |
| 9 | p,p'-(Thiopropionamido)-biphenyl | 4',4'''-bi[S-(N-phenylpropionimidoyl)hydrosulfamine]. |
| 10 | Thiobutyranilide | S-(N-phenylbutyrimidoyl)-hydrosulfamine. |
| 11 | Thio-p-valerotoluidide | S-(N-p-tolylvalerimidoyl)-hydrosulfamine. |
| 12 | m-Methylthiobenzanilide | S-(N-phenyl-m-methylbenzimidoyl)hydrosulfamine. |
| 13 | N-(p-ethoxyphenyl)thiobenzamide. | S-[N-(p- ethoxyphenyl)benzimidoyl]hydrosulfamine. |
| 14 | N-(2-Naphthyl)thiobenzamide. | S-[N-(2-naphthyl)benzimidoyl]hydrosulfamine. |
| 15 | 3'-nitrothiobenzanilide | S-[N-(3-nitrophenyl)benzimidoyl]hydrosulfamine. |
| 16 | Thio-p-benzanisidide | S-(N-p-anisylbenzimidoyl)-hydrosulfamine. |
| 17 | Thio-p-benzophenetidide | S-(N-p-ethoxyphenylbenzimidoyl)hydrosulfamine. |
| 18 | 4-nitrothiobenzanilide | S-(N-phenyl-4-nitrobenzimidoyl)hydrosulfamine. |
| 19 | 4-ethylsulfonylthiobenzanilide. | S-(N-phenyl-4-ethylsulfonylbenzimidoyl)hydrosulfamine. |
| 20 | 3,3'-dimethylthiobenzanilide. | S-[N-(m-tolyl)-3-methylbenzimidoyl]hydrosulfamine. |
| 21 | N,α-diphenylthioacetamide | S-(N-phenyl-α-phenylacetimidoyl)hydrosulfamine. |
| 22 | N-phenyl-2-thiofuramide | S-(N-phenyl-2-furimidoyl)-hydrosulfamine. |
| 23 | Thiophene-2-thiocarbanilide | S-(N-phenyl-2-thiophenecarbimidoyl)hydrosulfamine. |

The substituted hydrosulfamines of this invention, such as S,S'-terephthaloylbis(hydrosulfamine), S-thiobenzoylhydrosulfamine, S-benzoylhydrosulfamine, S-anisoylhydrosulfamine, S-(p-nitrobenzoyl)hydrosulfamine, S-(3,4 - dichlorobenzoyl)hydrosulfamine, S - (1 - naphthoyl)hydrosulfamine, S - (2 - furoyl)hydrosulfamine, S(p-chlorothiobenzoyl)hydrosulfamine, S - (N - phenylacetimidoyl)hydrosulfamine and S - (N - phenylbenzimidoyl) hydrosulfamine, are all useful as rubber curing agents and produce unreinforced stocks of high tensile strength as illustrated by the following example.

EXAMPLE A

Part A

Rubber compounding was carried out on a rubber mill as follows:

| | Parts |
|---|---|
| Natural rubber | 20 |
| Zinc oxide | 1.2 |
| Stearic acid | 0.1 |
| Mercaptobenzothiazole | 0.1 |
| S-benzoylhydrosulfamine | 2.0 |

The above ingredients were milled in at 70° C. in the order given and the compounded stock was cured in a mold at 140° C. for 40 minutes. The resulting rubber had a tensile strength of 2430 p.s.i. at 660% elongation.

Part B

The procedure of Part A was repeated except that 2.6 parts of S-(1-naphthoyl)hydrosulfamine was used in place of S-benzoylhydrosulfamine. The rubber had a tensile strength of 3940 p.s.i. at 700% elongation.

Part C

A control run was carried out by repeating the procedure of Part A except that the S-benzoylhydrosulfamine was omitted. The product was a sticky material with tensile strength near zero.

What is claimed is:

1. Substituted hydrosulfamines of the formula:

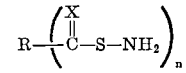

wherein $n$ is 1, 2 or 3;

X is O, S or NR';

when X is O or S, R is a substituted or unsubstituted aryl radical of up to 18 carbon atoms;

when X is NR', R is a substituted or unsubstituted alkyl, aralkyl or aryl radical of up to 18 carbon atoms;

R' is a substituted or unsubstituted aryl radical of up to 18 carbon atoms;

wherein the substituents on the alkyl, aralkyl, and aryl radicals are selected from the group consisting of lower alkyl, lower alkoxy, aryloxy, halogen, hydroxy, nitro, lower alkylthio, lower alkylsulfonyl, phenylsulfonyl, phenylazo, and trifluoromethyl.

2. The compound of claim 1 in which R=phenyl; X=O and n=1: S-benzoylhydrosulfamine.

3. The compound of claim 1 in which R=p-methoxyphenyl; X=O and n=1: S-anisoylhydrosulfamine.

4. The compound of claim 1 in which R=p-nitrophenyl; X=O and n=1: S-(p-nitrobenzoyl)hydrosulf- 5. The compound of claim 1 in which R=3,4-dichlorophenyl; X=O and n=1: S=(3,4-dichlorobenzoyl)hydrosulfamine.

6. The compound of claim 1 in which R=p-phenylene; X=O and n=2: S,S'-terephthaloylbis(hydrosulfamine).

7. The compound of claim 1 in which R=naphthyl; X=O and n=1: S-(1-naphthoyl)hydrosulfamine.

8. The compound of claim 1 in which R=furyl; X=O and n=1: S-(2-furoyl)hydrosulfamine.

9. The compound of claim 1 in which R=phenyl; X=S and n=1: S-thiobenzoylhydrosulfamine.

10. The compound of claim 1 in which R=p-chlorophenyl; X=S and n=1: S(p-chlorothiobenzoyl)hydrosulfamine.

11. The compound of claim 1 in which R=methyl; X=N-phenyl and n=1: S-(N-phenylacetimidoyl)hydrosulfamine.

12. The compound of claim 1 in which R=phenyl; X= N-phenyl and n=1: S-(N-phenylbenzimidoyl)hydrosulfamine.

13. A process for the preparation of substituted hydrosulfamines consisting essentially of contacting compounds of the formula:

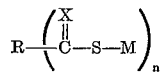

wherein n, R and X are defined as in claim 1 and M is an alkali metal or alkaline earth metal hydroxylamine-O-sulfonates in the presence of water at about 0°–100° C.

14. The process of claim 13 wherein X is O.

15. The process of claim 13 wherein X is S.

16. The process of claim 13 wherein X is N-phenyl.

17. The process of claim 13 wherein the reactants are contacted at about 0°–50° C.

18. The process of claim 13 wherein the reactants are contacted at about 10°–25° C.

19. The process of claim 13 wherein the equivalent molar ratio of compound

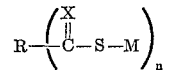

to the alkali metal or alkaline earth metal hydroxylamine-O-sulfonate is between 1:1 or 1:2.

References Cited

Bohme et al., Chem. Abst. (1952), vol. 97, 2684a.

ALEX MAZEL, Primary Examiner

B. I. DENTZ, Assistant Examiner

U.S. Cl. X.R.

260—607, 566, 207.1, 332.3; 332.2, 783, 793, 795, 327, 351

PO-1050
(5/69)

UNITED STATES PATENT OFFICE
CERTIFICATE OF CORRECTION

Patent No. 3,631,071     Dated December 28, 1971

Inventor(s) Maynard S. Raasch

It is certified that error appears in the above-identified patent and that said Letters Patent are hereby corrected as shown below:

Col. 1, line 67, insert --with alkali metal -- after "alkali metal";

Col. 5, line 10, change "phenly" to -- phenyl --;

Col. 6, Table I, all in Col. B thereof; change item 1 to read -- S-(o-toluoyl)hydrosulfamine. --; item 2, -- S-(p-toluoyl)hydrosulfamine. --; item 6, S-(p-phenylbenzoyl)hydrosulfamine. --; item 15, S-(2,4-Dichlorobenzoyl)hydrosulfamine. --; item 20, S-(9,anthroyl)hydrosulfamine. --; item 23, S-[4-(p-chlorophenylsulfonyl)benzoyl]hydrosulfamine. --; item 24, S-(2,3-dimethoxybenzoyl)hydrosulfamine --; and item 26, S-(3,5-dinitro-o-toluoyl)-hydrosulfamine.--;

Col. 8, Claim 4, -- amine -- should be inserted at the end thereof; and

Col. 9, Claim 13, line 11, insert -- with alkali metal -- after "alkali metal".

Signed and sealed this 6th day of June 1972.

(SEAL)
Attest:

EDWARD M. FLETCHER, JR.        ROBERT GOTTSCHALK
Attesting Officer              Commissioner of Patents